(12) United States Patent
Cho et al.

(10) Patent No.: US 7,502,080 B2
(45) Date of Patent: Mar. 10, 2009

(54) LIQUID CRYSTAL DISPLAY AND MANUFACTURING METHOD THEREOF

(75) Inventors: Jung-Hwan Cho, Gyeonggi-do (KR); Jang-Hyun Yeo, Seoul (KR); Seung-Hwan Moon, Gyeonggi-do (KR); Jun-Pyo Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 401 days.

(21) Appl. No.: 11/340,131

(22) Filed: Jan. 26, 2006

(65) Prior Publication Data
US 2006/0203145 A1 Sep. 14, 2006

(30) Foreign Application Priority Data
Mar. 11, 2005 (KR) .................. 10-2005-0020490

(51) Int. Cl.
*G02F 1/1335* (2006.01)
*H01S 5/00* (2006.01)
(52) U.S. Cl. .................. 349/61; 372/50.11; 372/50.124
(58) Field of Classification Search .................. 349/61
See application file for complete search history.

(56) References Cited

U.S. PATENT DOCUMENTS

| | | | | |
|---|---|---|---|---|
| 5,452,385 | A | * | 9/1995 | Izumi et al. .................. 385/37 |
| 6,002,458 | A | * | 12/1999 | Kaneko et al. .................. 349/61 |
| 6,175,440 | B1 | * | 1/2001 | Conemac .................. 359/204 |
| 6,608,849 | B2 | * | 8/2003 | Mawst et al. .................. 372/43.01 |
| 6,975,369 | B1 | * | 12/2005 | Burkholder .................. 349/61 |
| 2002/0001055 | A1 | * | 1/2002 | Kimura et al. .................. 349/112 |

\* cited by examiner

*Primary Examiner*—Michael H Caley
(74) *Attorney, Agent, or Firm*—MacPherson Kwok Chen & Heid LLP (57) ABSTRACT

A liquid crystal display includes a liquid crystal panel assembly with a plurality of pixels, a printed circuit board disposed under the liquid crystal panel assembly, and a plurality of laser diodes disposed on the printed circuit board. The laser diodes are disposed to correspond to substantially respective pixels of the liquid crystal panel assembly. In another embodiment, the liquid crystal display includes a light-guiding layer formed on the laser diodes.

12 Claims, 6 Drawing Sheets

LIQUID CRYSTAL DISPLAY AND MANUFACTURING METHOD THEREOF

CROSS-REFERENCE TO RELATED APPLICATIONS

This application claims the benefit of Korean Patent Application No.2005-0020490, filed on Mar. 11, 2005, in the Korean Intellectual Property Office, the disclosure of which is incorporated herein by reference.

BACKGROUND OF THE INVENTION

1. Field of the Invention

The present invention relates to a liquid crystal display (LCD) and a manufacturing method having the same, and more particularly to a light source used in backlighting an LCD.

2. Description of the Related Art

Generally, a liquid crystal display (LCD) includes a pair of panels each having electrodes formed on their inner surfaces, and a dielectric anisotropy liquid crystal layer interposed between the panels. In the LCD, a variation of a voltage difference between field generating electrodes, i.e., a variation in strength of an electric field generated by the electrodes, changes the transmittance of light passing through the LCD, and thus desired images are obtained by controlling the voltage difference between the electrodes.

In the LCD, the light may be a natural light or an artificial light emitted from a light source separately employed in the LCD.

A backlight unit is a representative device for providing the artificial light to the LCD and utilizes light emitting diodes (LEDs) or fluorescent lamps, such as cold cathode fluorescent lamps (CCFLs), external electrode fluorescent lamps (EEFLs), etc., as the light source.

Of these, the LEDs have eco-friendly characteristics because they do not use mercury (Hg), and their working lifetime is longer than the lifetimes of any other light sources due to their stable characteristics. For these reasons, the LEDs are particularly in the spotlight as a next-generation light source. However, since red, green, and blue lights, emitted from the LEDs, have wide wavelength ranges, an interference area where the three lights are mixed together becomes wider. Accordingly, color reproducibility of the LCDs employing the LEDs degrades.

SUMMARY OF THE INVENTION

An objective of the present invention is to improve color reproducibility of an LCD.

To achieve the objective, the present invention utilizes an improved vertical-cavity surface-emitting laser (VCSEL) as a light source.

In detail, according to an aspect of the present invention, there is provided an LCD including an LC panel assembly with a plurality of pixels, a printed circuit board (PCB) disposed under the LC panel assembly, and a plurality of laser diodes disposed on the PCB. The laser diodes are disposed to correspond to substantially respective pixels of the liquid crystal panel assembly.

The LCD may further include a wiring for connecting the laser diodes, and a light-guiding layer formed on the laser diodes and the wiring.

The light-guiding layer can convert light emitted from the laser diodes into a surface light, and it may be made of resin or a transparent material such as indium tin oxide (ITO) or indium zinc oxide (IZO).

Preferably, the light-guiding layer has an uneven pattern at a top surface thereof.

Each laser diode includes a lower distributed Bragg reflector (DBR) formed on the PCB, an n-type contact layer formed on the lower DBR, a lower n-type carrier-confining layer and a lower electrode that are formed on the n-type contact layer, a resonant layer formed on the lower n-type carrier-confining layer, an insulating layer that is formed on a partial region of the resonant layer, an electric current-confining layer that is formed on the remaining region of the resonant layer, a p-type contact layer formed on the insulating layer and the electric current-confining layer, an upper DBR formed on a partial portion of the p-type contact layer, and an upper electrode formed on the remaining portion of the p-type contact layer.

The plurality of laser diodes includes a red laser diode, a green laser diode, and a blue laser diode.

The LCD may further include two insulating layers that are individually formed on the upper electrode and the lower electrode, for insulating the two electrodes from the light-guiding layer.

According to another aspect of the present invention, there is provided a manufacturing method of an LCD including the steps of forming a liquid crystal panel assembly including a plurality of pixels, and forming laser diodes on a printed circuit board disposed under the liquid crystal panel assembly. The laser diodes are arrayed to correspond to substantially respective pixels of the liquid crystal panel assembly.

The method may further include the step of forming a light-guiding layer on the laser diodes.

The laser diodes may include red, green and blue laser diodes and the red, green, and blue laser diodes may be arrayed to correspond to red, green, and blue pixels, respectively, of the liquid crystal panel assembly.

The formation step of the light-guiding layer may include coating a transparent layer, forming a mask pattern for etching the top surface of the transparent layer, and selectively etching the top surface of the transparent layer through the mask pattern.

The light-guiding layer may be made of resin or a transparent material such as ITO or IZO.

BRIEF DESCRIPTION OF THE DRAWINGS

The above objects and other advantages of the present invention will become more apparent by describing the embodiments thereof in more detail with reference to the accompanying drawings.

DETAILED DESCRIPTION OF THE EMBODIMENTS

Embodiments of the present invention will be described in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

Hereinafter, an LCD according to an embodiment of the present invention will be described in detail with reference to the accompanying drawings.

Figure 1:
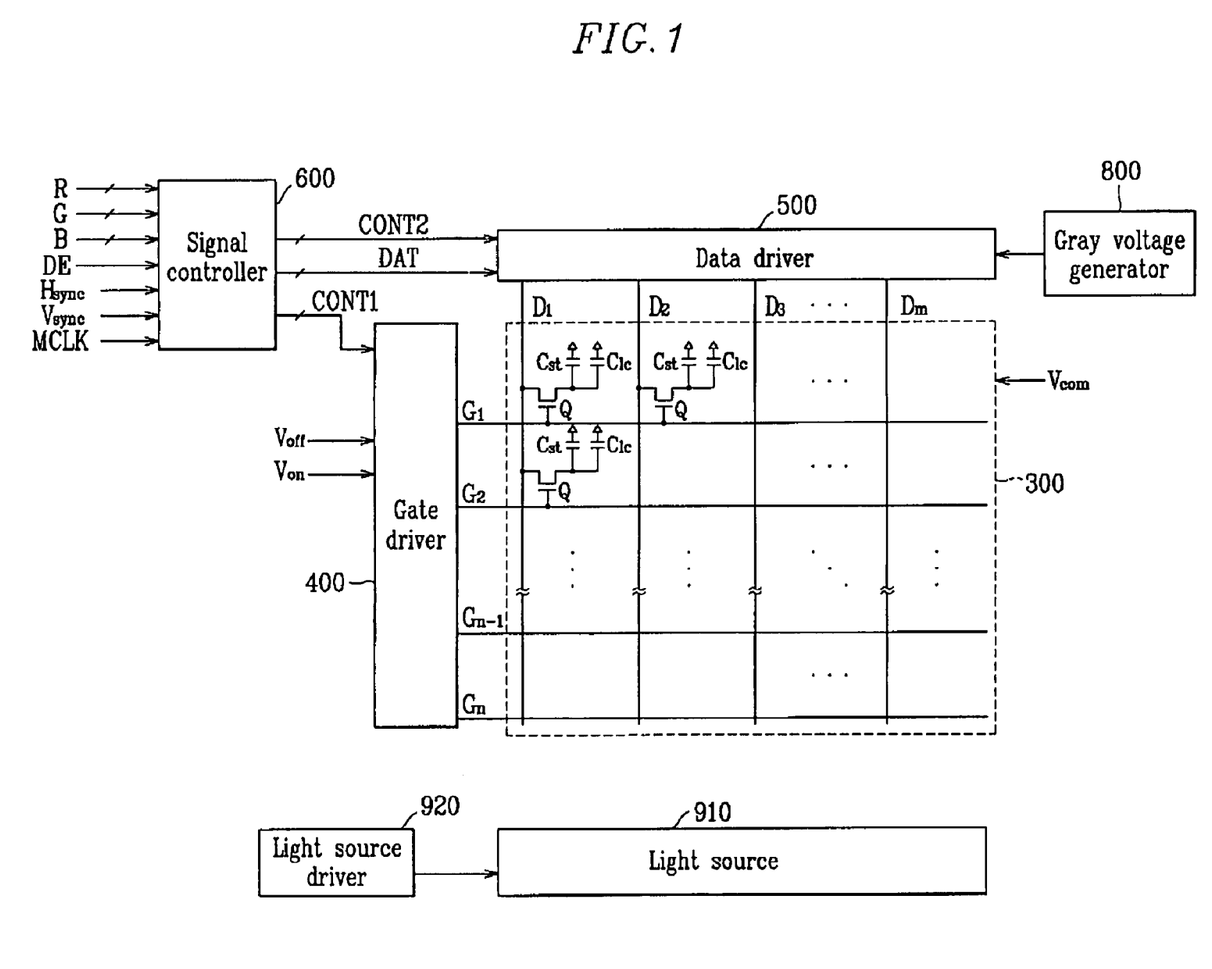
FIG. 1 is a block diagram of an LCD according to an embodiment of the present invention.
Figure 2:
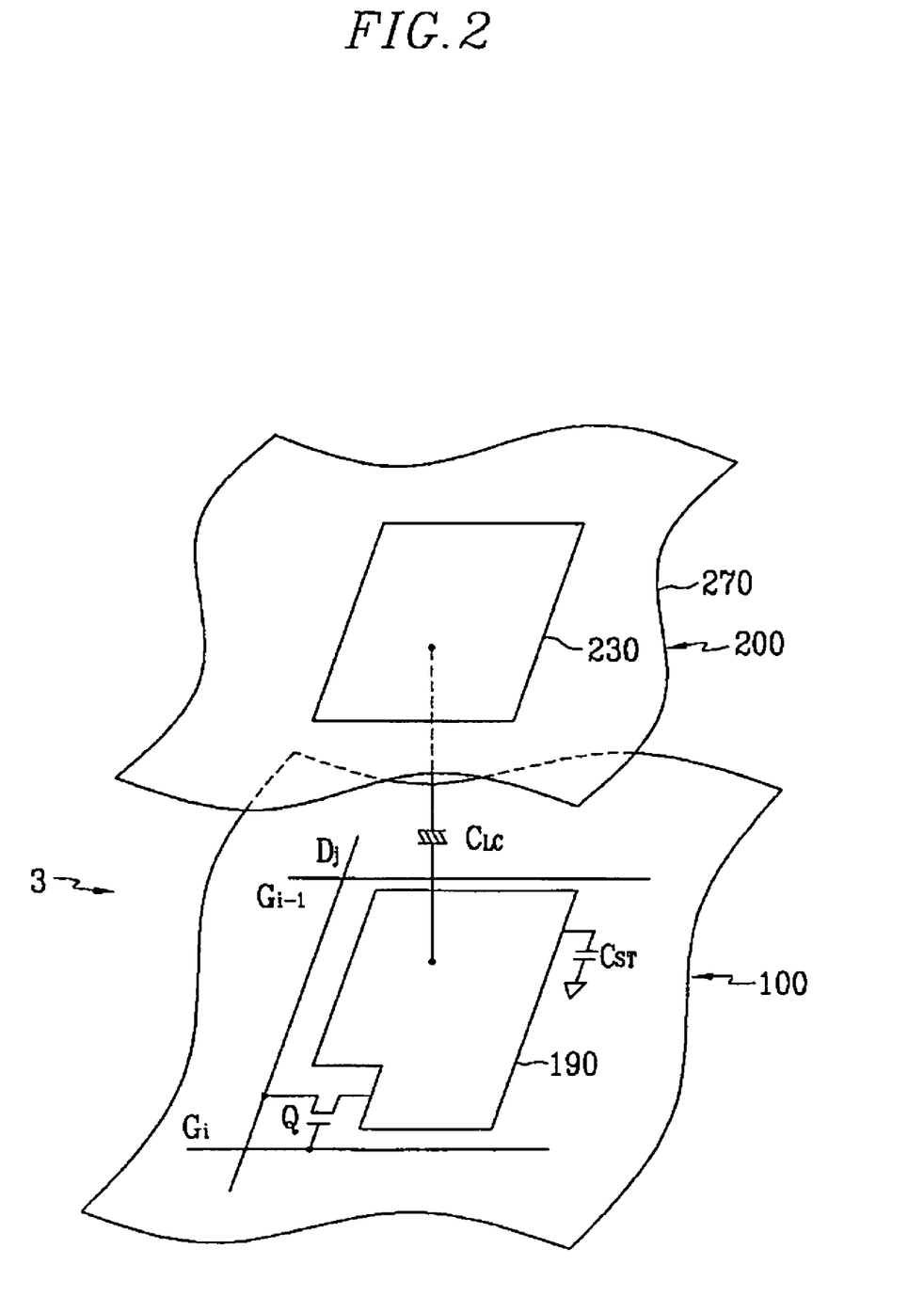
FIG. 2 is an equivalent circuit view of a pixel unit of the LCD of FIG. 1.

FIG. 1 is a block diagram of an LCD according to an embodiment of the present invention, and FIG. 2 is an equivalent circuit view of a pixel unit of the LCD in FIG. 1. Referring to FIG. 1 and FIG. 2, an LCD comprises a liquid crystal (LC) panel assembly 300, a gate driver 400 and a data driver 500 that are each connected to the LC panel assembly 300, a gray voltage generator 800 connected to the data driver 500, a light source 910 for supplying light to the LC panel assembly 300, a light source driver 920 for controlling the light source 910, and a signal controller 600 for controlling the data driver 500, the gate driver 400, and the light source driver 920.

The LC panel assembly 300 includes a lower panel 100 and an upper panel 200 facing each other, and an LC layer 3 interposed therebetween. The LC panel assembly 300 further includes a plurality of display signal lines $G_1$-$G_n$ and $D_1$-$D_m$ and a plurality of pixels that are connected thereto and arranged substantially in a matrix.

The display signal lines $G_1$-$G_n$ and $D_1$-$D_m$ are provided on the lower panel 100 and include a plurality of gate lines $G_1$-$G_n$ for transmitting gate signals (also referred to as "scanning signals"), and a plurality of data lines $D_1$-$D_m$ for transmitting data signals. The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element Q that is connected to one of the gate lines $G_1$-$G_n$ and one of the data lines $D_1$-$D_m$, and an LC capacitor $C_{LC}$ and a storage capacitor $C_{ST}$ that are connected to the switching element Q. The storage capacitor $C_{ST}$ may be omitted.

The switching element Q, such as a thin film transistor (TFT), is provided on the lower panel 100 and has three terminals: a control terminal connected to one of the gate lines $G_1$-$G_n$; an input terminal connected to one of the data lines $D_1$-$D_m$; and an output terminal connected to both the LC capacitor $C_{LC}$ and the storage capacitor $C_{ST}$.

The LC capacitor $C_{LC}$ includes a pixel electrode 190, provided on the lower panel 100, and a common electrode 270, provided on the upper panel 200, as two terminals. The LC layer 3 interposed between the two electrodes 190 and 270 functions as the dielectric of the LC capacitor $C_{LC}$. The pixel electrode 190 is connected to the switching element Q, and the common electrode 270 covers the entire surface of the upper panel 200 and receives a common voltage $V_{com}$.

Alternatively, the common electrode 270 may be provided on the lower panel 100. In this case, at least one of the two electrodes 190 and 270 may be shaped as a bar or a stripe.

The storage capacitor $C_{ST}$ is an auxiliary capacitor for the LC capacitor $C_{LC}$. When the pixel electrode 190 and a separate signal line (not shown) that is provided on the lower panel 100 are overlapped with each other, with an insulator interposed therebetween, the overlap portion becomes the storage capacitor $C_{ST}$. The separate signal line is supplied with a predetermined voltage such as the common voltage $V_{com}$, or the like. Alternatively, the storage capacitor $C_{ST}$ may be formed by overlapping the pixel electrode 190 and a previous gate line that is placed directly before the pixel electrode 190, interposing an insulator therebetween.

For color display, each pixel uniquely exhibits one of the three primary colors (i.e., spatial division), or sequentially exhibits the three primary colors in turn depending on time (i.e., temporal division), so that the spatial or temporal sum of the primary colors are recognized as a desired color. FIG. 2 shows an example of the spatial division where each pixel includes a color filter 230 that exhibits one of the primary colors in an area of the upper panel 200 corresponding to the pixel electrode 190. Alternatively, the color filter 230 may be provided on or under the pixel electrode 190 of the lower panel 100.

A polarizer (not shown) is attached to either outer surface of the two panels 100 and 200 of the LC panel assembly 300 in order to polarize light emitted from the light source 910. Otherwise, a set of polarizers may be individually attached to the outer surfaces of the two panels 100 and 200.

Figure 3:
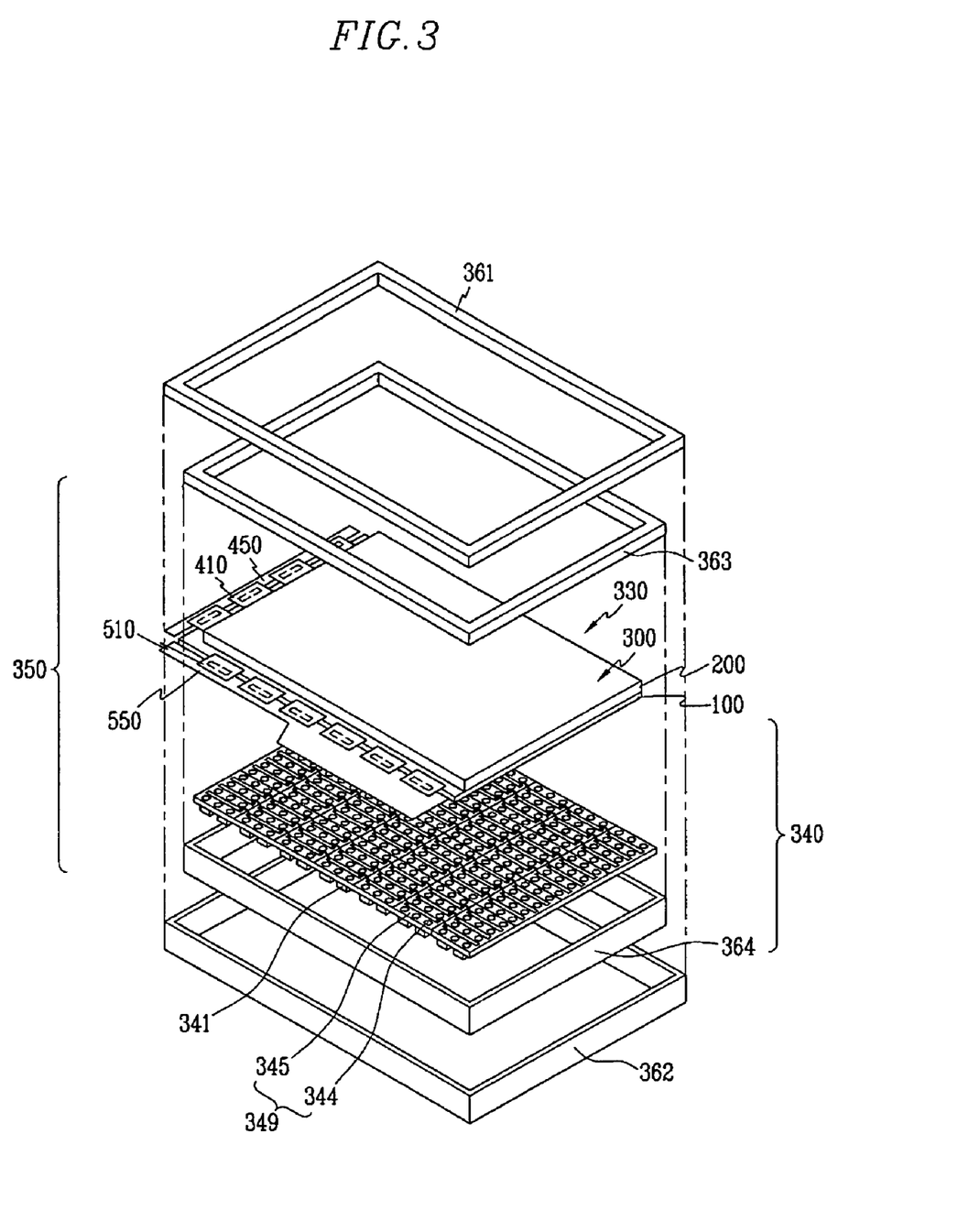
FIG. 3 is an exploded perspective view schematically illustrating the LCD of FIG. 1.

FIG. 3 is an exploded perspective view schematically illustrating an LCD in FIG. 1.

Referring to FIGS. 1 and 3, the gray voltage generator 800 is included in a data PCB 550 and generates two sets of a plurality of gray voltages related to the transmittance of the pixels. One set of the gray voltages has positive polarity with respect to the common voltage $V_{com}$, while the other set of the gray voltages has negative polarity with respect to the common voltage $V_{com}$.

The gate drivers 400 are individually mounted on each gate TCP 410, having the shape of integrated circuit (IC) chips, and are individually connected to the gate lines $G_1$-$G_n$ of the LC panel assembly 300 for transmitting the gate signals, consisting of combinations of the gate-on voltage $V_{on}$ and the gate-off voltage $V_{off}$ input from an external device, to the gate signal lines $G_1$-$G_n$.

The data drivers 500 are individually mounted on each data TCP 510, having the shape of IC chips, and are individually connected to the data lines $D_1$-$D_m$ of the LC panel assembly 300 for transmitting the data voltages, which are selected from the gray voltages supplied from the gray voltage generator 800, to the data signal lines $D_1$-$D_m$.

Alternatively, the gate drivers 400 or the data drivers 500 may be mounted on the lower panel 100 in the shape of IC chips, or may be integrated into the lower panel 100 with a thin film transistor (TFT) process. In both cases, a gate PCB 450 or the gate TCPs 410 can be omitted.

The signal controller 600 is included in the data PCB 550 or the gate PCB 450 and controls the operation of the gate driver 400 or the data driver 500.

Hereinafter, the operation of the above-mentioned LCD will be described in detail.

The signal controller 600 receives input image signals R, G, and B and input control signals for controlling the display thereof such as a vertical synchronizing signal $V_{sync}$, a horizontal synchronizing signal $H_{sync}$, a main clock MCLK, a data enable signal DE, etc., from an external graphic controller (not shown). In response to the input image signals R, G, and B and the input control signals, the signal controller 600 processes the image signals R, G, and B suitably for the operation of the LC panel assembly 300 and generates gate control signals CONT1 and data control signals CONT2, and then outputs the gate control signals CONT1 and the data control signals CONT2 to the gate driver 400 and the data driver 500, respectively.

The gate control signals CONT1 include a vertical synchronizing start signal STV for informing the gate driver 400 of the beginning of a frame, a gate clock signal CPV for controlling the output time of the gate-on voltage $V_{on}$, and an output enable signal OE for defining the duration of the gate-on voltage $V_{on}$.

The data control signals CONT2 include a horizontal synchronizing start signal STH for informing the data driver 500 of the beginning of data transmission, a load signal LOAD for instructing to apply the data voltages to the data lines $D_1$-$D_m$, a reverse signal RVS for reversing the polarity of the data voltages with respect to the common voltage $V_{com}$, and a data clock signal HCLK.

In response to the data control signals CONT2 from the signal controller 600, the data driver 500 successively receives the image data DAT for a row of the pixels from the signal controller 600, shifts them, converts the image data DAT into analog data voltages selected from the gray voltages from the gray voltage generator 800, and then applies the data voltages to data lines $D_1$-$D_m$.

The gate driver 400 applies the gate-on voltage Von to the gate lines $G_1$-$G_n$ in response to the gate control signals CONT1 from the signal controller 600, thereby turning on the switching elements Q connected thereto. The data voltages applied to the data lines $G_1$-$G_n$ are applied to the corresponding pixel through the activated switching elements Q.

The difference between the data voltage applied to the pixel and the common voltage $V_{com}$ is represented as a voltage across the LC capacitor $C_{LC}$, namely, a pixel voltage. The LC molecules in the LC layer 3 have orientations depending on the magnitude of the pixel voltage.

The light source driver 920 switches laser diodes 344, which form the light source 910 by controlling an electric current applied to the light source 910, and modulates the brightness of light emitted from the laser diodes 344.

When light emitted from the laser diodes 344 in response to the operation of the light source driver 920 passes through the LC layer 3, polarization of the light is varied depending on orientations of the LC molecules in the LC layer 3. The polarizer(s) converts the difference of the light polarization into a difference of the light transmittance.

By repeating this procedure by a unit of the horizontal period (which is denoted by "1H" and is equal to one period of the horizontal synchronizing signal $H_{sync}$, the data enable signal DE, and the gate clock CPV), all gate lines $G_1$-$G_n$ are sequentially supplied with the gate-on voltage $V_{on}$ during a frame, thereby applying the data voltages to all pixels. When the next frame starts after finishing one frame, the reverse control signal RVS applied to the data driver 500 is controlled such that the polarity of the data voltages is reversed with respect to that of the previous frame (which is referred to as "frame inversion"). The reverse control signal RVS may also be controlled such that the polarity of the data voltages, which flow along a data line in one frame, are reversed (for example, line inversion and dot inversion), or the polarity of the data voltages in one packet are reversed (for example, column inversion and dot inversion).

Hereinafter, the light source 910 with a plurality of laser diodes 344 will be described in more detail with reference to FIG. 3.

Referring to FIG. 3, an LCD comprises an LC module 350 including a display unit 330 and a backlight unit 340, a front housing 361 and a rear housing 362 for receiving and supporting the LC module 350, and mold frames 363 and 364.

The display unit 330 includes an LC panel assembly 300, gate tape carrier packages (TCPs) 410 and data TCPs 510 that are attached to the LC panel assembly 300, and a gate PCB 450 and a data PCB 550 that are individually attached to the corresponding TCPs 410 and 510.

The backlight unit 340 is mounted under the LC panel assembly 300. The backlight unit 340 comprises a light source unit 349 consisting of a PCB 345 and a plurality of laser diodes 344 disposed thereon, a heat-radiating plate 341 that is placed under the PCB 345 to disperse heat generated when the laser diodes 344 produce light, and a mold frame 364.

The laser diodes 344, serving as the light source, consist of red, green, and blue laser diodes that emit red, green, and blue light, respectively, in a perpendicular direction to the PCB 345. The red, green, and blue laser diodes 344 are disposed on the PCB 345 at specific positions corresponding to red, green, and blue pixels, respectively. Due to this structure, the LCD can realize color display without color filters 230. The red, green, and blue laser diodes 344 are connected to each other via interconnection wiring (not shown).

One or more polarizers (not shown) are attached to at least one of the two panels 100 and 200.

Figure 4:
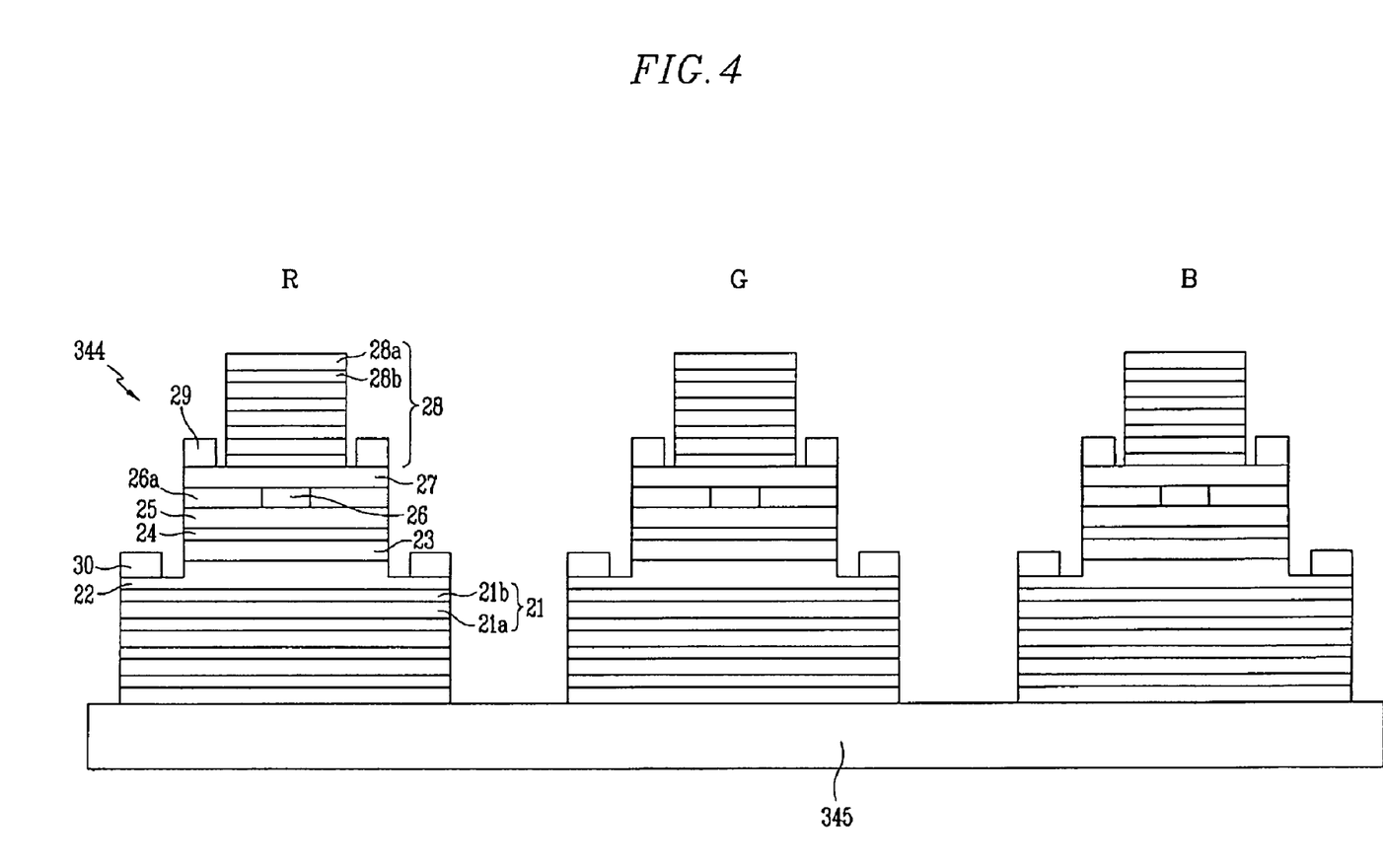
FIG. 4 is a cross-sectional view of the three color (red, green, and blue) laser diodes in FIG. 3.

FIG. 4 is a cross-sectional view of the three color (red, green, and blue) laser diodes in FIG. 3. As shown in FIG. 4, a red laser diode R, a green laser diode G, and a blue laser diode B are provided on the PCB 345, at specific positions corresponding to relative pixels of the LC panel assembly 300.

The laser diode 344 is configured as follows.

A lower Distributed Bragg Reflector (DBR) 21 is formed on a PCB 345. The lower DBR 21 comprises a plurality of pairs of alternating layers (21*a*/21*b*/21*a*/21*b* . . . ) of two materials having low and high refractive indexes, respectively. An n-type contact layer 22 is formed over the lower DBR 21. A lower n-type carrier-confining layer 23, an active layer 24, and an upper p-type carrier-confining layer 25 are formed in sequence on a partial portion of the n-type contact layer 22. These three layers 23, 24, and 25 form a resonant layer. An electric current-confining layer 26 occupies a predetermined region on the resonant layer, and an insulating layer 26*a* occupies the remaining region. In this structure, an electric current for laser emission flows only through the electric current-confining layer 26 to the active layer 24. A p-type contact layer 27 is formed on the electric current-confining layer 26 and the insulating layer 26*a*. An upper DBR 28 is formed on a partial portion of the p-type contact layer 27. Similar to the lower DBR 21, the upper DBR 28 comprises a plurality of pairs of alternating layers (28*a*/28*b*/28*a*/28*b* . . . ) of two materials having low and high refractive indexes, respectively. A lower electrode 30 is formed on the edge of the n-type contact layer 22, while an upper electrode 29 is formed on the edge of the p-type contact layer 27.

The laser emission from the laser diode 344 (See FIG. 3) results from a voltage applied across the upper electrode 29 and the lower electrode 30. The voltage induces an electric current to flow to the active layer 24 of the resonant layer, so that carrier recombination occurs in the active layer 24 and light is emitted from the active layer 24. The emitted light from the active layer 24 by the carrier recombination becomes brighter and brighter by repeatedly running between the lower DBR 21 and the upper DBR 28.

Referring back to FIG. 3, the laser diode 344 emits light in a normal direction to the PCB 345, and the light emitted from the laser diode 344 has a narrower wavelength range than those of red, green, and blue light emitted from known LEDs and known CCFLs in the art. Due to these characteristics, color reproducibility of the LCD is improved.

The color of the light emitted from the laser diode 344 is determined depending on the kinds of the formation materials of thin films that are combined together to form the laser diode 344 and the thickness of those thin films. That is, each of the laser diodes 344 emits one of red, green, and blue light according to the formation materials and thickness of those thin films.

When the red laser diode R, the green laser diode G, and the blue laser diode B, which are produced on the basis of the above-mentioned principle and emit red, green, and blue lights, respectively, are located to correspond to a red pixel, a green pixel, and a blue pixel, respectively, color display is realized without color filters.

Hereinafter, a light source according to another embodiment of the present invention will be described in detail with reference to FIG. 5 and FIG. 6. Detailed descriptions for the reference numerals that are the same as ones previously mentioned will be omitted to avoid duplicate description.

Figure 5:
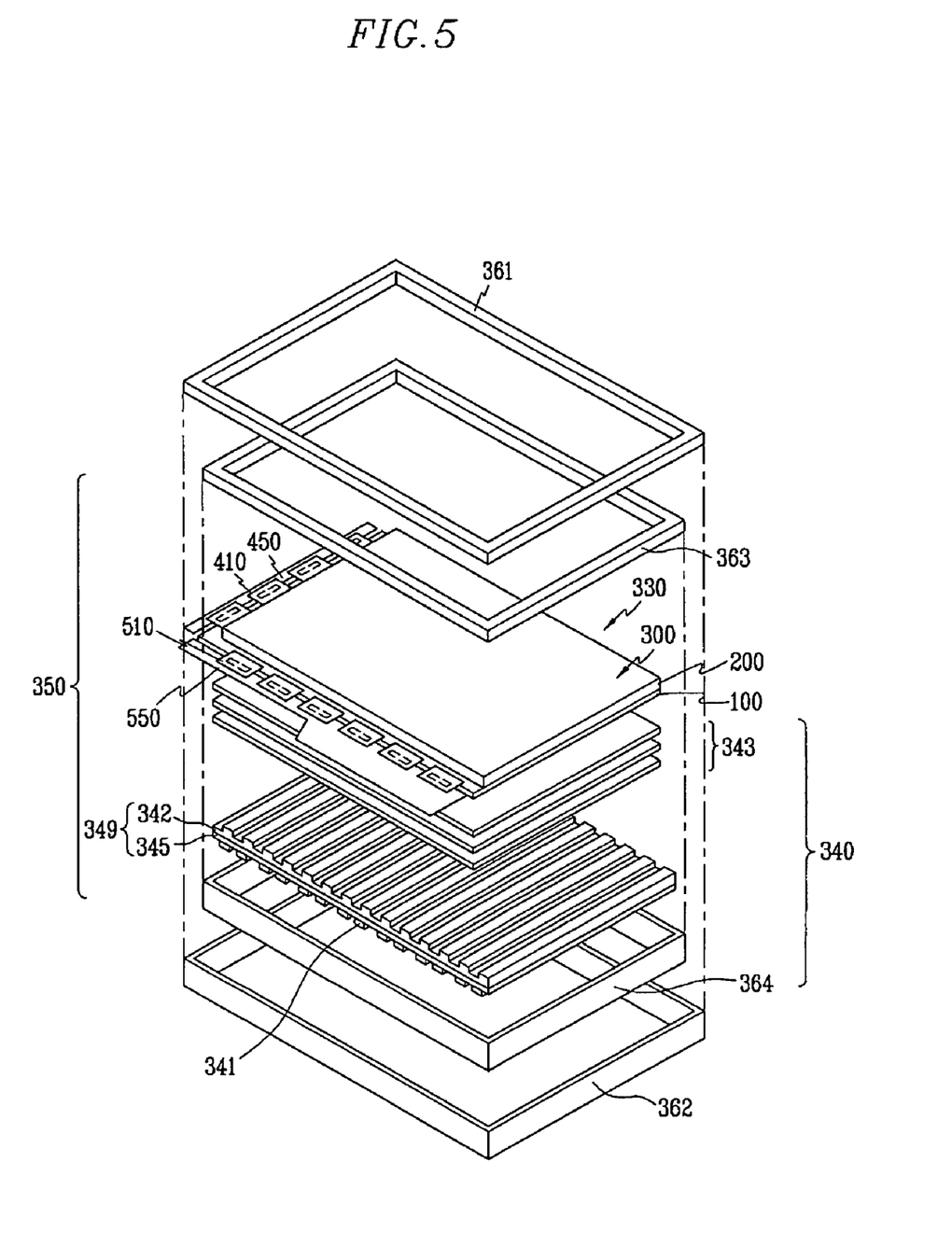
FIG. 5 is an exploded perspective view schematically illustrating an LCD according to another embodiment of the present invention.
Figure 6:
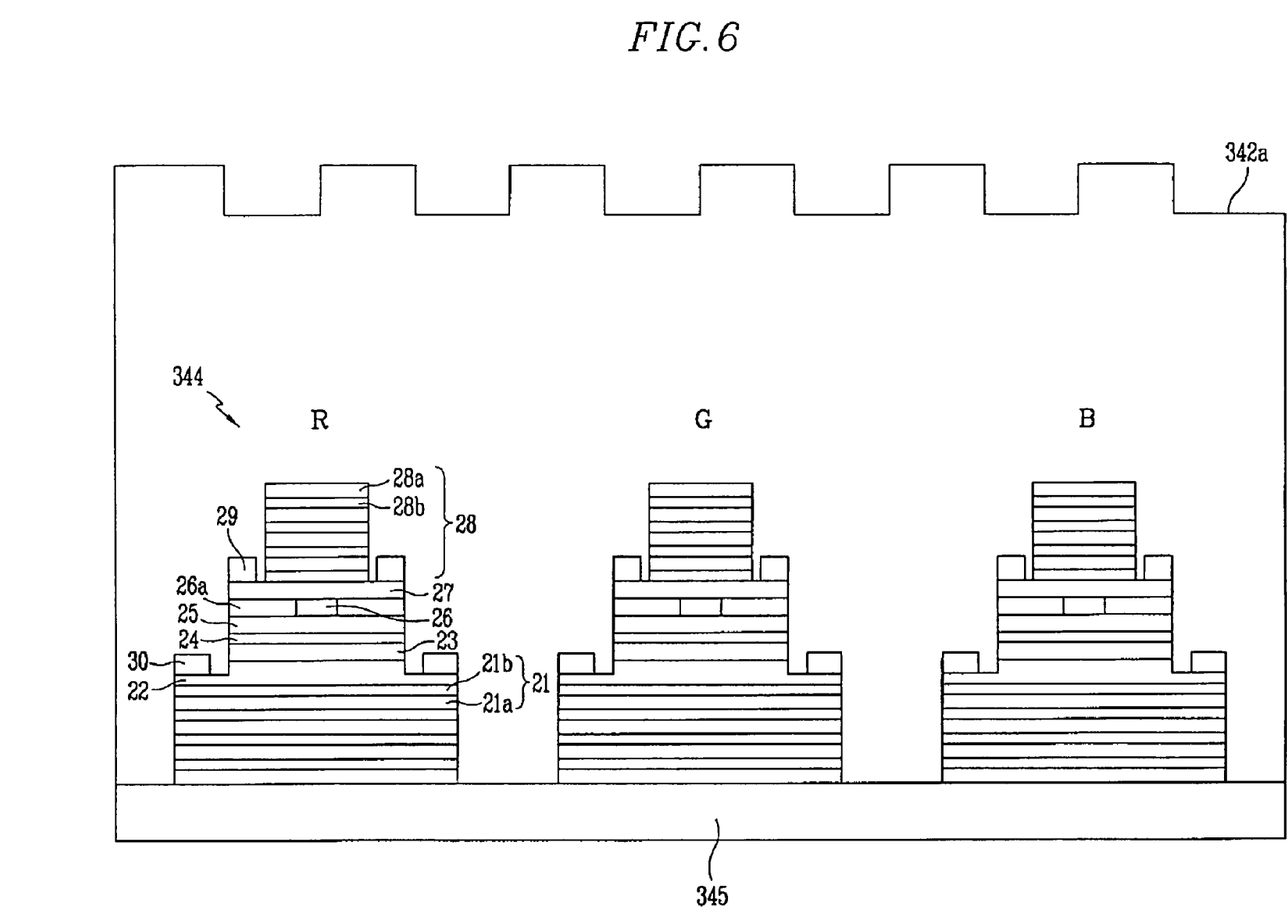
FIG. 6 is a cross-sectional view of the three color (red, green, and blue) laser diodes in FIG. 5.

FIG. 5 is an exploded perspective view schematically illustrating an LCD according to another embodiment of the present invention, and FIG. 6 is a cross-sectional view of the three color (red, green, and blue) laser diodes in FIG. 5. Referring to FIG. 5, an LCD comprises an LC module 350 including a display unit 330 and a backlight unit 340, a front housing 361 and a rear housing 362 for receiving and supporting the LC module 350, and mold frames 363 and 364.

The display unit 330 includes an LC panel assembly 300, gate tape carrier packages (TCPs) 410 and data TCPs 510 that are attached to the LC panel assembly 300, and a gate PCB 450 and a data PCB 550 that are individually attached to the corresponding TCPs 410 and 510.

The backlight unit 340 is mounted under the LC panel assembly 300. The backlight 340 comprises a light source unit 349 consisting of a PCB 345 with a plurality of laser diodes 344 arrayed thereon, a light-guiding layer 342 for dispersing light emitted from the laser diodes 344 to the LC panel assembly 300, a plurality of optical sheets 343 that are placed between the LC panel assembly 300 and the light-guiding layer 342, a heat-radiating plate 341 that is placed under the PCB 345 to disperse heat generated when the laser diodes 344 produce light, and a mold frame 364 for maintaining a regular interval between the PCB 345 and the optical sheets 343 and for supporting the PCB 345 and the optical sheets 343 therein.

The light-guiding layer 342 may be made of a transparent insulator, such as, but not limited to, resin, or a transparent conductor, such as, but not limited to, ITO or IZO. In case that the light-guiding layer 342 is made of a transparent conductor, electrodes of the laser diode 344 should be covered with an insulating material to insulate the electrodes from the light-guiding layer 342. The light-guiding layer 342 has an uneven top surface for dispersion of light. The uneven top surface of the light guiding layer 342 is formed of a plurality of protrusions and grooves. The top surface of the protrusions and grooves may have a shape of, such as, but not limited to, a stripe, a rectangle, a circle, a shape corresponding to the pixel structure, etc.

Two polarizers (not shown) are individually attached to the outer surfaces of the two panels 100 and 200 to polarize light emitted from the light source unit 349.

Referring to FIG. 6, a red laser diode R, a green laser diode G, and a blue laser diode B are disposed on a PCB 345. At this time, the red laser diode R, the green laser diode G, and the blue laser diode B are placed at specific positions corresponding to relevant pixels of an LC panel assembly 300. The formation materials of thin films that are integrated together to form the laser diode 344 and the thickness of those thin films determine the color of light emitted from the laser diode 344. In other words, each of the laser diodes 344 emits one among red, green, and blue lights depending on the formation materials and thickness of those thin films.

The laser diodes 344 emit light in a normal direction to the PCB 345, and semiconductor formation materials, which can be used in the visible light region, such as GaAs, GaInN, AlGaInP, and the like, are used for the formation of the laser diodes 344.

A top surface of a light-guiding layer 342a, which is formed over the laser diodes 344, has an uneven pattern. The uneven pattern is a result of ITO or IZO deposition and photolithography for the deposited layer. If the formation material of the light-guiding layer 342 is a transparent conductor, electrodes 29 and 30 of the laser diode 344 should be covered with an insulating material to insulate the electrodes 29 and 30 from the light-guiding layer 342, prior to the formation of the light-guiding layer 342.

The uneven pattern, formed at the top surface of the light-guiding layer 342, is produced by a photo-etching process using a photoresist pattern, as previously mentioned. The light-guiding layer 342 converts point light emitted from the laser diodes 344 into surface light. Accordingly, red, green, and blue light, emitted from the laser diodes 344, are mixed together and dispersed by the light-guiding layer 342, thereby producing white light. The dispersed white light is transmitted to the LC panel assembly 300, thereby contributing to display.

As mentioned above, the LCD of the present invention can realize color display without any color filters by providing the red, green, and blue diodes respectively emitting red, green, and blue lights, at places corresponding to the red, green, and blue pixels, respectively. Omission of the color filters leads to simplification of the manufacturing process and reduction of manufacturing cost. In addition, since a wavelength range of light emitted from each laser diode is shorter than that of any other light sources, a wave interference region is relatively narrow. Accordingly, color reproducibility of the LCD is improved. Further, the light-guiding layer converts the point light emitted from the laser diodes into the surface light, improving light efficiency.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A liquid crystal display comprising:
   a liquid crystal panel assembly with a plurality of pixels;
   a printed circuit board disposed under the liquid crystal panel assembly; and
   a plurality of laser diodes disposed on the printed circuit board,
   wherein the laser diodes are disposed to correspond to substantially respective pixels of the liquid crystal panel assembly, and
   further wherein each of the laser diodes comprises:
   a lower distributed Bragg reflector formed on the printed circuit board;
   an n-type contact layer formed on the lower distributed Bragg reflector;
   a lower n-type carrier-confining layer and a lower electrode that are formed on the n-type contact layer;
   a resonant layer formed on the lower n-type carrier-confining layer;
   an insulating layer that is formed on a predetermined region of the resonant layer;
   an electric current-confining layer that is formed on the remaining region of the resonant layer;
   a p-type contact layer formed on the insulating regions and the electric current-confining layer;
   an upper distributed Bragg reflector formed on a partial portion of the p-type contact layer; and an upper electrode formed on the remaining portion of the p-type contact layer.

2. The liquid crystal display of claim 1, further comprising a wiring for connecting the laser diodes, and a light-guiding layer formed on the laser diodes and the wiring.

3. The liquid crystal display of claim 2, wherein the light-guiding layer converts light emitted from the laser diodes into a surface light.

4. The liquid crystal display of claim 2, wherein the light-guiding layer is made of resin or a transparent material such as ITO or IZO.

5. The liquid crystal display of claim 2, wherein the light-guiding layer has an uneven pattern at a top surface thereof.

6. The liquid crystal display of claim 1, wherein the laser diodes comprise a red laser diode, a green laser diode, and a blue laser diode.

7. The liquid crystal display of claim 2, further comprising two insulating layers that are individually formed on the upper electrode and the lower electrode, for insulating the two electrodes from the light-guiding layer.

8. A method of manufacturing a liquid crystal display comprising:
    (A) forming a liquid crystal panel assembly including a plurality of pixels; and
    (B) forming laser diodes on a printed circuit board disposed under the liquid crystal panel assembly, wherein the laser diodes are arrayed to correspond to substantially respective pixels of the liquid crystal panel assembly, and
    further wherein each of the laser diodes comprises:
    a lower distributed Bragg reflector formed on the printed circuit board;
    an n-type contact layer formed on the lower distributed Bragg reflector;
    a lower n-type carrier-confining layer and a lower electrode that are formed on the n-type contact layer;
    a resonant layer formed on the lower n-type carrier-confining layer;
    an insulating layer that is formed on a predetermined region of the resonant layer;
    an electric current-confining layer that is formed on the remaining region of the resonant layer;
    a p-type contact layer formed on the insulating regions and the electric current-confining layer;
    an upper distributed Bragg reflector formed on a partial portion of the p-type contact layer; and
    an upper electrode formed on the remaining portion of the p-type contact layer.

9. The method of claim 8, further comprising:
    (C) forming a light-guiding layer on the laser diodes.

10. The method of claim 8, wherein the laser diodes comprise red, green and blue laser diodes and the red, green, and blue laser diodes are arrayed to correspond to red, green, and blue pixels, respectively, of the liquid crystal panel assembly.

11. The method of claim 8, wherein the step (C) is comprised of:
    coating a transparent layer;
    forming a mask pattern for etching the top surface of the transparent layer; and
    selectively etching the top surface of the transparent layer through the mask pattern.

12. The method of claim 8, wherein the light-guiding layer is made of resin or a transparent material such as ITO or IZO.

* * * * *